(12) United States Patent
Binkert

(10) Patent No.: US 9,009,928 B2
(45) Date of Patent: Apr. 21, 2015

(54) FASTENING DEVICE

(75) Inventor: Sven Binkert, Loerrach (DE)

(73) Assignee: A. Raymond et Cie, Grenoble (FR)

( * ) Notice: Subject to any disclaimer, the term of this patent is extended or adjusted under 35 U.S.C. 154(b) by 32 days.

(21) Appl. No.: 13/885,280

(22) PCT Filed: Jan. 30, 2012

(86) PCT No.: PCT/EP2012/051445
§ 371 (c)(1),
(2), (4) Date: May 14, 2013

(87) PCT Pub. No.: WO2012/104250
PCT Pub. Date: Aug. 9, 2012

(65) Prior Publication Data
US 2013/0302087 A1    Nov. 14, 2013

(30) Foreign Application Priority Data

Feb. 2, 2011   (DE) .................. 10 2011 010 141
May 26, 2011   (DE) .................. 20 2011 101 112 U

(51) Int. Cl.
| | |
|---|---|
| *A44B 1/04* | (2006.01) |
| *A44B 11/25* | (2006.01) |
| *A44B 17/00* | (2006.01) |
| *E04F 19/02* | (2006.01) |
| *F16B 2/24* | (2006.01) |
| *F16B 21/08* | (2006.01) |

(52) U.S. Cl.
CPC .................. *F16B 2/24* (2013.01); *Y10T 403/70* (2015.01); *F16B 2/243* (2013.01); *F16B 21/086* (2013.01)

(58) Field of Classification Search
CPC ............ F16B 2/24; F16B 2/243; F16B 5/125; F16B 5/128; F16B 4/004
USPC .............. 403/32; 24/292, 293, 294, 295, 458, 24/581.11; 411/329
See application file for complete search history.

(56) References Cited

U.S. PATENT DOCUMENTS

| | | | |
|---|---|---|---|
| 5,759,004 A * | 6/1998 | Kuffel ........................... | 411/508 |
| 6,976,292 B2 | 12/2005 | MacPherson et al. | |
| 7,226,260 B2 * | 6/2007 | Jackson et al. ................ | 411/173 |
| 7,874,775 B2 | 1/2011 | Hullmann et al. | |
| 8,370,999 B2 * | 2/2013 | Camus ........................... | 24/295 |
| 8,646,155 B2 | 2/2014 | Ribes Marti | |

(Continued)

FOREIGN PATENT DOCUMENTS

| | | |
|---|---|---|
| EP | 1510702 A1 | 3/2005 |
| EP | 2182226 A1 | 5/2010 |
| FR | 2928428 A1 | 9/2009 |
| JP | 2008-542645 A | 11/2008 |
| JP | 2012-519623 A | 8/2012 |

(Continued)

OTHER PUBLICATIONS

International Search Report and Written Opinion mailed May 7, 2012 in related International Application No. PCT/EP2012/051445.

*Primary Examiner* — Michael P Ferguson
*Assistant Examiner* — Nahid Amiri
(74) *Attorney, Agent, or Firm* — Faegre Baker Daniels LLP

(57) ABSTRACT

A fastening device for connecting an attachment to a support part has a cover plate and side walls which are integrally formed on the cover plate and form a U-shaped profile. Mutually opposite edge wings and supporting cheeks supported on supporting edges are present on shaft arms. This results in a highly rigid, block-like construction of the fastening device which is highly resistant to very high pull-out forces.

20 Claims, 11 Drawing Sheets

(56) References Cited

U.S. PATENT DOCUMENTS

2005/0271492 A1 12/2005 Jackson, Jr. et al.
2012/0301218 A1* 11/2012 De Jong et al. ............... 403/326

FOREIGN PATENT DOCUMENTS

| WO | WO2010/055485 A1 | 5/2010 |
| WO | WO2010/101803 A1 | 9/2010 |

* cited by examiner

US 9,009,928 B2

FASTENING DEVICE

CROSS-REFERENCE TO RELATED APPLICATIONS

This application is a U.S. National Phase Patent Application based on International Application No. PCT/EP2012/051445 filed Jan. 30, 2012, which claims priority to German Patent Application No. 10 2011 010 141.1 filed Feb. 2, 2011 and German Patent Application No. 20 2011 101 112.0 filed May 26, 2011, the entire disclosures of which are hereby explicitly incorporated by reference herein.

BACKGROUND OF THE INVENTION

1. Field of the Invention

The invention concerns a fastening device.

2. Description of the Related Art

One known fastening device is disclosed in WO 2010/101803 A1. The prior fastening device for fastening an attachment to a support part has a flat cover plate disposed in a head region and two shaft arms that are connected to the cover plate and extend away from the cover plate toward a foot region. Each shaft arm has an outer wing and an inner wing; formed on each inner wing of a shaft arm are supporting cheeks that engage through supporting-cheek openings formed in the outer wing of the respective shaft arm. Also formed on each outer wing of each shaft arm are two edge wings that extend toward each other. The edge wings are positioned between the supporting cheeks and the cover plate.

SUMMARY OF THE INVENTION

The present invention provides a fastening device that is distinguished by very high pull-out forces and high rigidity.

By virtue of the fact that side walls are formed on the cover plate and form a U-shaped profile with the cover plate and the outer wings extend on both sides of the supporting-cheek clearances, the fastening device achieves high rigidity, resulting in high pull-out forces through the use of multiple U-profiles.

In one form thereof, a fastening device for fastening an attachment to a support part, including a flat cover plate that is disposed in a head region and including two shaft arms that are connected to the cover plate and extend away from the cover plate toward a foot region, wherein each shaft arm has an outer wing and an inner wing, wherein formed on each inner wing of a shaft arm is a respective supporting cheek that engages through supporting-cheek clearances configured in the outer wing of the particular shaft arm, and wherein formed on each outer wing of each shaft arm are edge wings that extend toward each other, characterized in that formed on the cover plate are side walls which with the cover plate form a U-shaped profile, in that each outer wing is formed on a respective side wall, and in that the edge wings extend each on a respective side of the supporting-cheek clearances.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
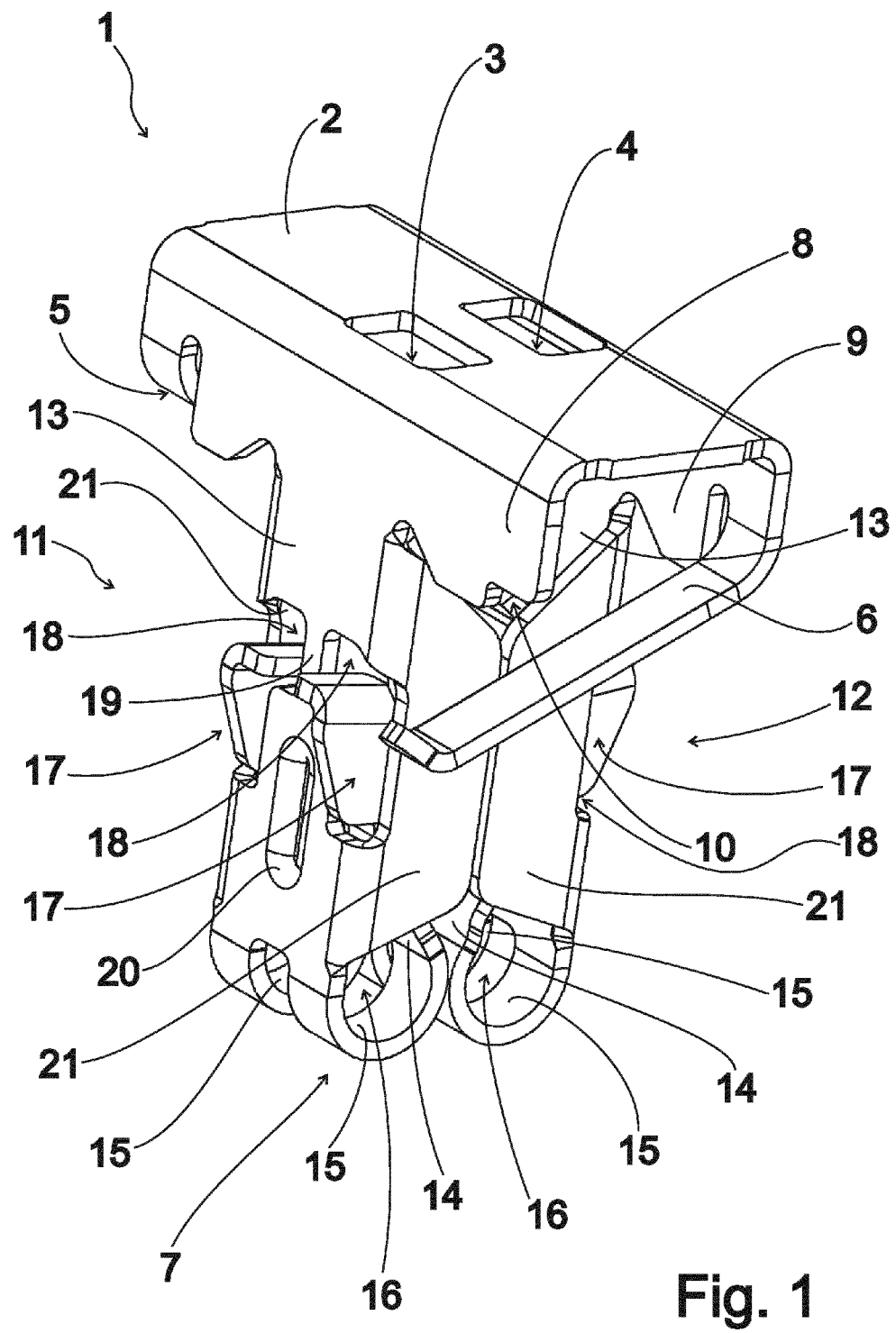
FIG. 1 is a perspective view of one exemplary embodiment of a fastening device according to the invention.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

FIG. 1 is a perspective view of an exemplary embodiment of a fastening device according to the invention, made from sheet metal in a stamping and bending process. The exemplary embodiment of FIG. 1 is provided, in a head region 1, with a flat cover plate 2 of substantially rectangular shape. In the middle of the cover plate 2 in the longitudinal direction, oppositely disposed openings 3, 4 are formed in the region of the edge sides. At the ends of the cover plate 2, spring arms 5, 6 are formed on the cover plate 2 and extend away from the cover plate 2 toward a foot region 7 disposed oppositely from the head region 1. In the exemplary embodiment shown, the spring arms 5, 6 are oriented transversely to the longitudinal direction of the cover plate 2 and extend opposite the side of the cover plate 2 that is turned toward the foot region 7.

Formed at the long edges of the cover plate 2 are side walls 8, 9, which are oriented substantially at right angles to the cover plate 2 and thus, together with the cover plate 2, form a U-shaped profile and result in high rigidity in the head region 1. Each side wall 8, 9 is configured, at its opposite end from a spring arm 5, 6, with a spring arm recess 10, which is so dimensioned that a spring arm 5, 6 assuming a deflected orientation substantially parallel to the cover plate 2 is disposed form-lockingly in the particular spring arm recess 10, whereas in the relaxed arrangement shown in FIG. 1, the spring arms 5,6 protrude beyond the side walls 8, 9 in the direction of the foot region 7.

Formed in the middle region of the side walls 8, 9 are two oppositely disposed shaft arms 11, 12 extending from the head region 1 toward the foot region 7, each of which comprises an outwardly disposed outer wing 13, which is attached to a respective side wall 8, 9, and an inner wing 14, said inner wings being connected to the outer wings 13 via, disposed in the foot region 7, pairs of bent-around portions 15 that enclose a bend clearance 16 and are disposed opposite each other inwardly between the outer wings 13. The spring properties of the inner wings 14 can be adjusted relatively easily via the width of the bent-around portions 15.

Formed on each inner wing 14 is a pair of supporting cheeks 17, which, in the relaxed arrangement depicted in FIG. 1, extend through supporting-cheek clearances 18, which are provided in the middle region of the outer wings 13, and outwardly beyond the outer wings 13. Between the supporting-cheek clearances 18 of an outer wing 13 there remains a middle web 19, and formed in alignment therewith is a respective stiffening rib 20 to stiffen the particular outer wing 13.

It can also be seen from the representation according to FIG. 1 that formed on the outer wings 13 of each shaft arm 11, 12 in this exemplary embodiment are edge wings 21, each of which extends toward the directly opposite edge wing 21 of the other outer wing 13. The edge wings 21 extend each on both sides of the supporting-cheek clearances 18, substantially over the entire length of the outer wings 13 of the shaft arms 11, 12, and lie with their mutually facing edges, which are straight in the exemplary embodiment of FIG. 1, opposite and immediately adjacent each other. The outer wings 13 are thereby blocked against inward deflection and are stiffened in a block-like manner.

Figure 2:
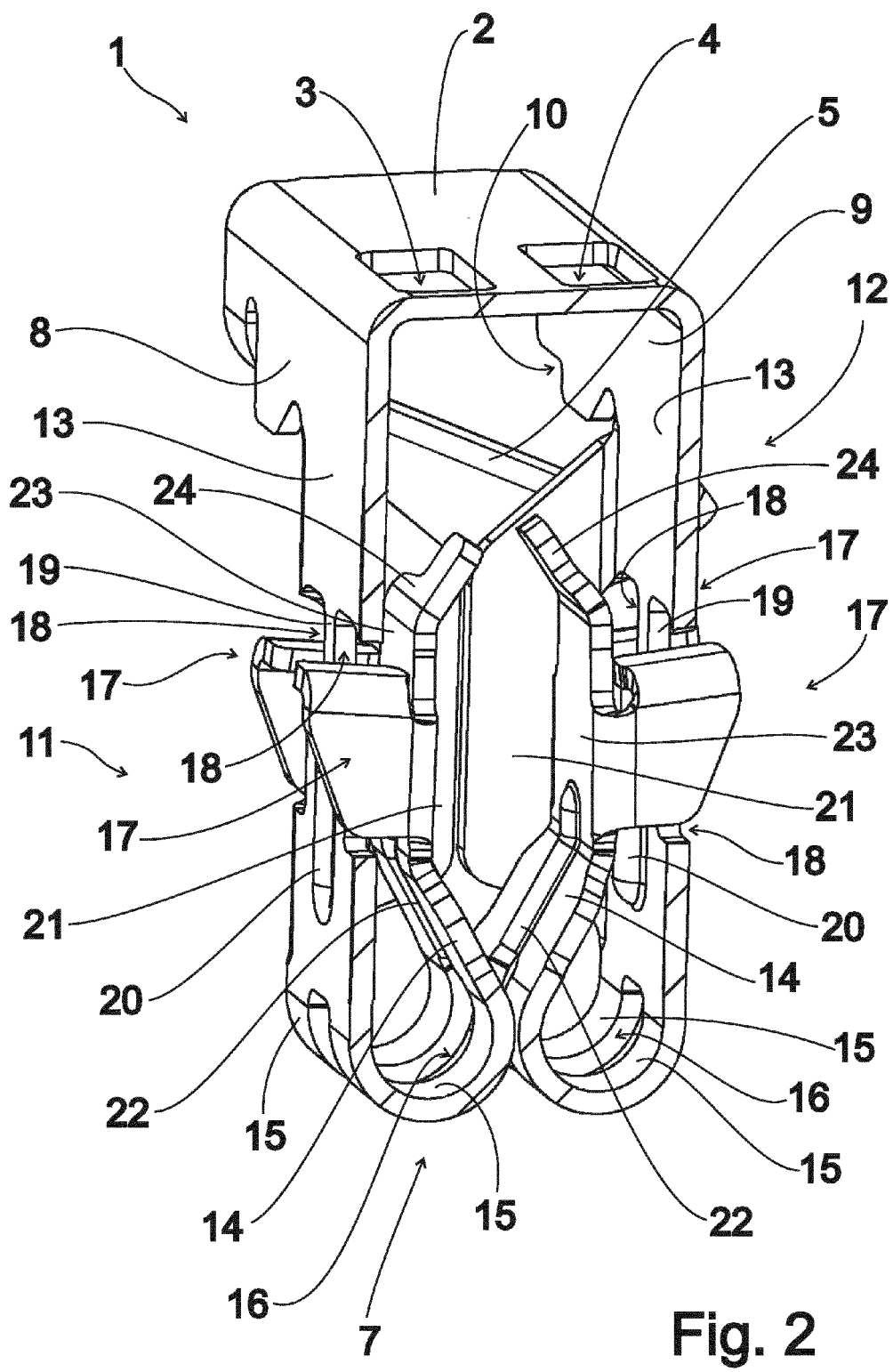
FIG. 2 is a perspective, partially cut-away view of the exemplary embodiment according to FIG. 1.

FIG. 2 is a perspective longitudinal section of the exemplary embodiment according to FIG. 1, looking in particular at the inner wings 14. It is apparent from FIG. 2 that the inner wings 14 are each provided with a respective stiffening rib 22, in prolongation of the respective bend clearance 16, to stiffen the inner wings 14 in their region proximate the foot region 7. It can also be seen from FIG. 2 that the supporting cheeks 17 are connected to the inner wings 14 via a bend having a middle portion 23 that is oriented approximately parallel to the outer wings 13.

Each inner wing 14 also has, opposite the cover plate 2, a respective end portion 24 that is bent, with respect to the middle portion 23, obliquely away from the outer wing 13 of the particular shaft arm 11, 12. It is also apparent from FIG. 2 that the end portions 24 are arranged opposite the access openings 3, 4, such that a disassembly tool (not shown in FIG. 2) can reach through the access openings 3, 4 and act on the end portions 24.

Figure 3:
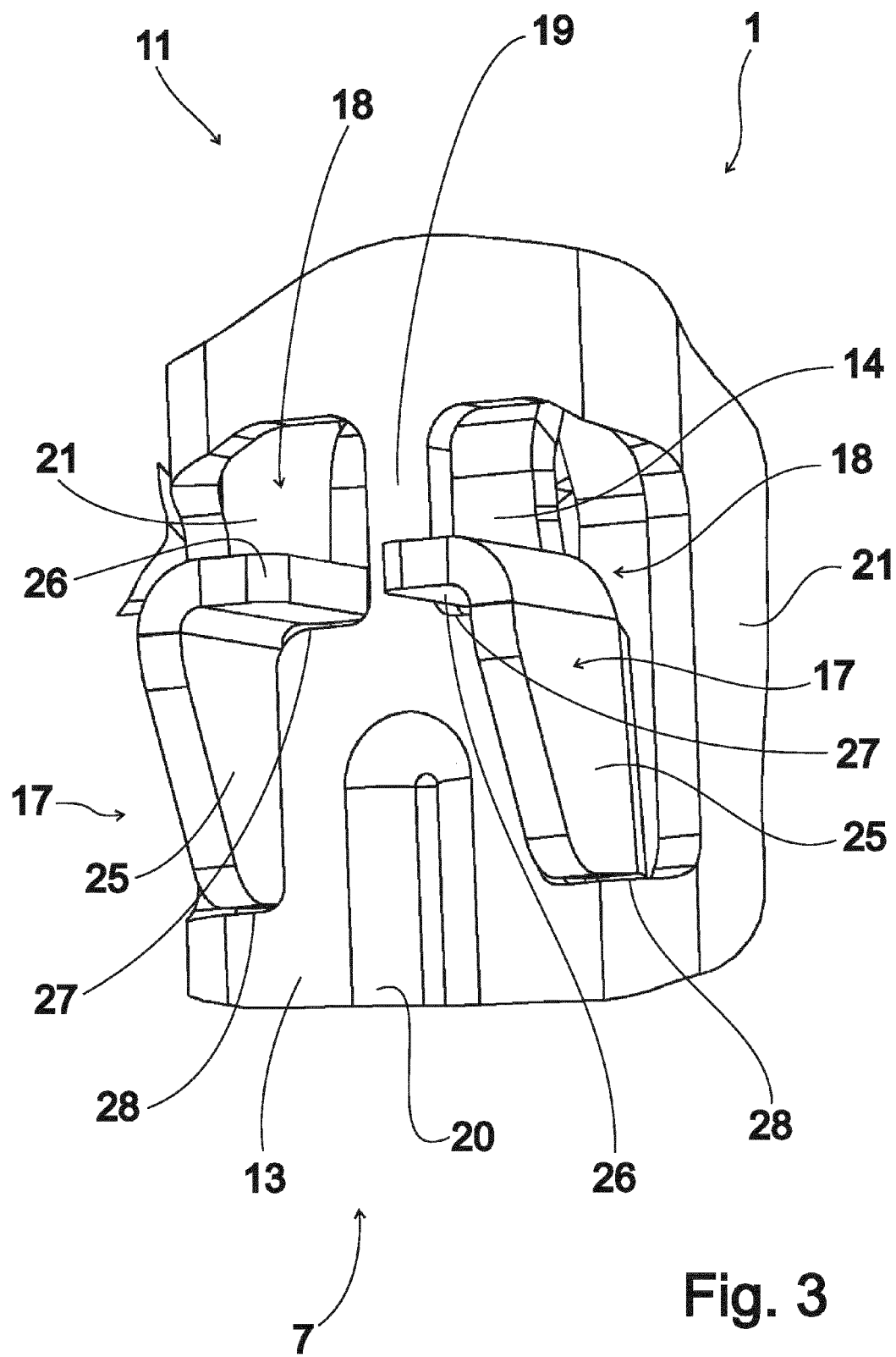
FIG. 3 is a perspective detail view of supporting cheeks of the exemplary embodiment according to FIG. 1.

FIG. 3 is a perspective detail view of a shaft arm 11 of the exemplary embodiment according to FIG. 1 in the region of the supporting cheeks 17 and the supporting-cheek clearances 18. It can be seen particularly clearly in FIG. 3 that each supporting cheek 17 is formed by a side portion 25 connected to the inner wing 14 and extending laterally in the longitudinal direction of the shaft arm 11, and by an abutting portion 26, which is oriented substantially at right angles to side portion 25 and is connected via an angled portion to the particular side portion 25, said abutting portions extending toward each other into the vicinity of the middle web 19. The outer edges of the side portions 25 facing away from the outer wings 13 are beveled toward the foot portion 7 to enable the shaft arms 11, 12 to be inserted with relatively low mounting forces through mounting apertures adapted to their cross section.

Each abutting portion 26 is disposed directly opposite a respective abutting-portion supporting edge 27 of the outer wing 13, arranged as a supporting edge on the side of the supporting-cheek clearance 18 proximate the foot region 7, thus blocking any bending of the abutting portions 26 toward the foot region 7. The edge faces of the side portions 25 proximate the foot region 7 are, in turn, disposed opposite side-portion supporting edges 28 configured as supporting edges in the end of each supporting-cheek clearance 18 proximate the foot region 7, thus also blocking any movement of the side portions 25 toward the foot region 7. This effectively prevents the supporting cheeks 17 from giving way when a high pull-out force is exerted on the illustrated and described exemplary embodiment of a fastening device according to the invention, in an intended mounted arrangement that will be described in more detail below.

Figure 4:
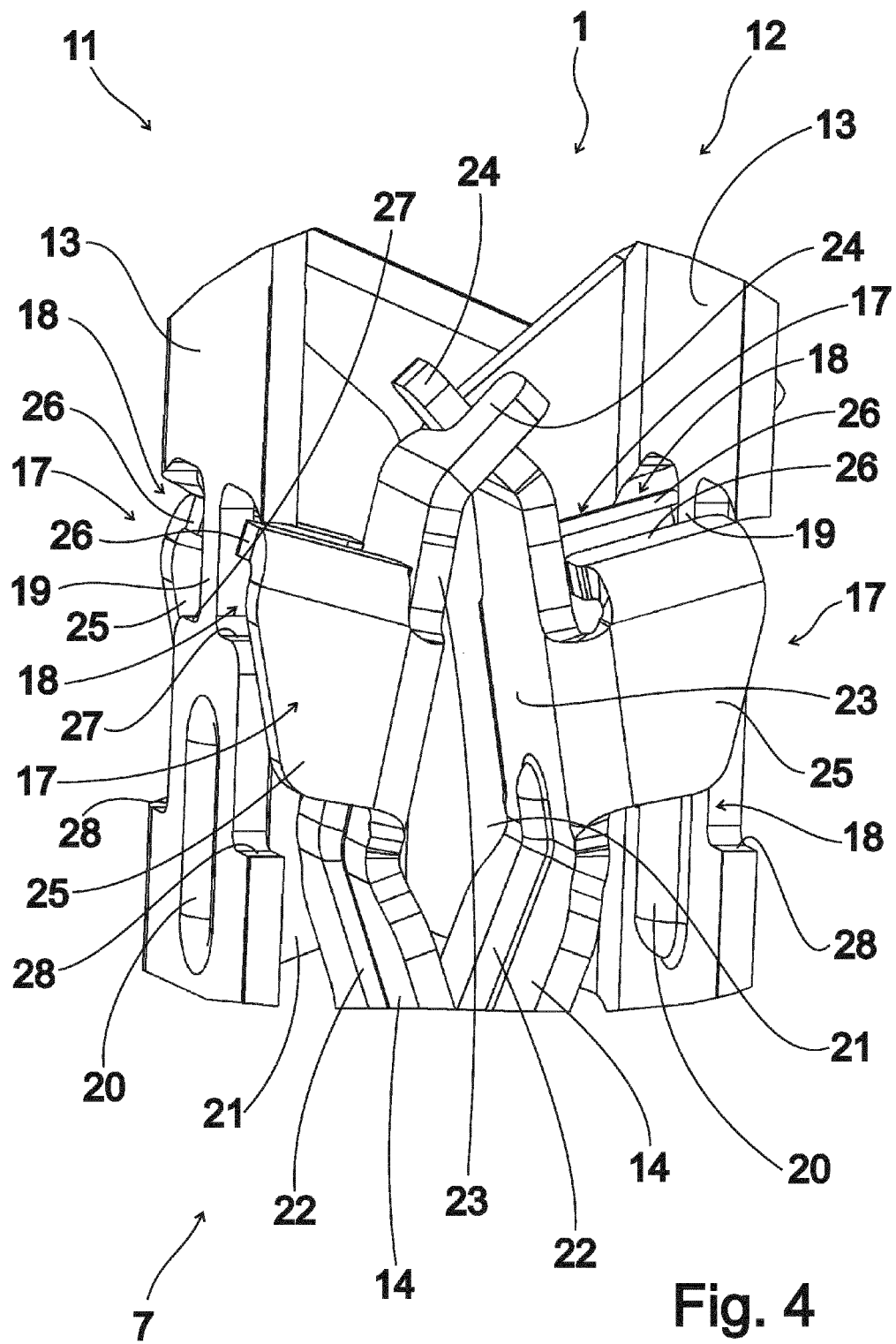
FIG. 4 is a perspective detail view of the exemplary embodiment according to FIG. 1 with mutually abutting free ends of inner wings of supporting cheeks.

FIG. 4 is a perspective detail view of the exemplary embodiment according to FIG. 1 in the region of the middle portions 23 and the end portions 24 of the inner wings 14, in an end position of a bending movement that bends the inner wing 14 inward, of the kind caused, for example, by a disassembly tool (not shown in FIG. 4) inserted through the access openings 3, 4 and acting on the end portions 24.

In this end position, the supporting cheeks 17 have fully entered the supporting-cheek clearances 18 and the inner space formed between the outer wings 13, with the result that the shaft arms 11, 12 can be guided without hindrance through the mounting apertures adapted to the cross sections of the shaft arms 11, 12. By virtue of a dovetail-like configuration of the end portions 24, the end portions 24 abut each other in the end position and block any further movement toward each other by the inner wings 14, even when high forces are exerted by the disassembly tool. Meanwhile, the supporting-cheek clearances 18 are sufficiently largely dimensioned in their respective ends proximate the head region 1 that inward movement of the supporting cheeks 17 into the end position shown in FIG. 4 is not opposed by resistance of any kind.

Figure 5:
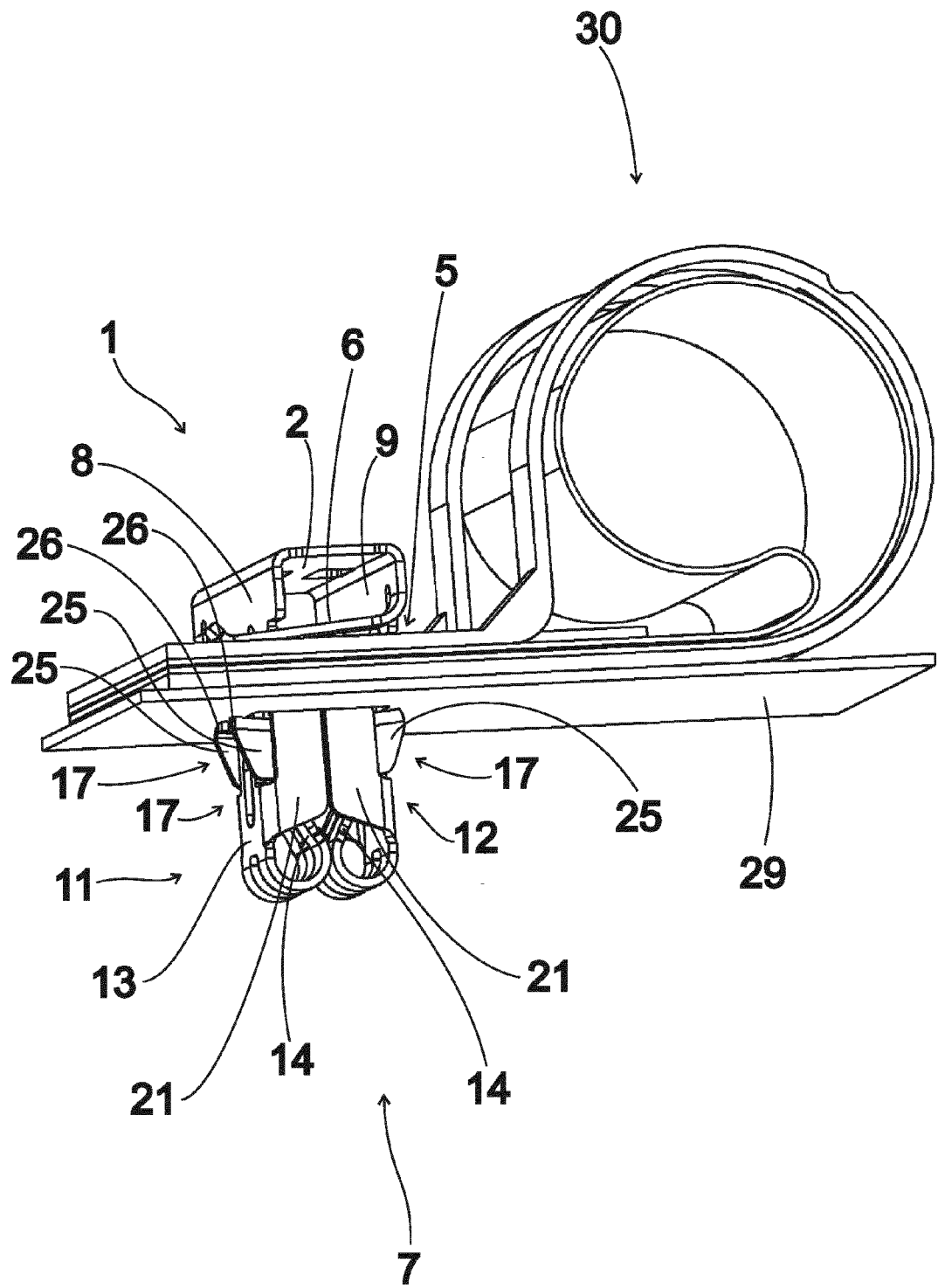
FIG. 5 is a perspective view of the exemplary embodiment according to FIG. 1 in a mounted situation.

FIG. 5 shows the exemplary embodiment of a fastening device according to the invention as depicted in FIG. 1 in an intended mounted arrangement, in which the shaft arms 11, 12 are guided through mounting apertures formed in a support part 29 having a high mechanical load capacity and in an attachment 30, here in the form of an airbag assembly. In the mounted arrangement, the abutting portions 26 of the supporting cheeks 17 engage the support part 29 from the back, on its side facing away from the attachment 30, while the spring arms 5, 6, and, where applicable, the edge faces of the side walls 8, 9 facing away from the cover plate 2, rest on the attachment 30. The attachment 30 is thereby fastened reliably but releasably to the support part 29.

Figure 6:
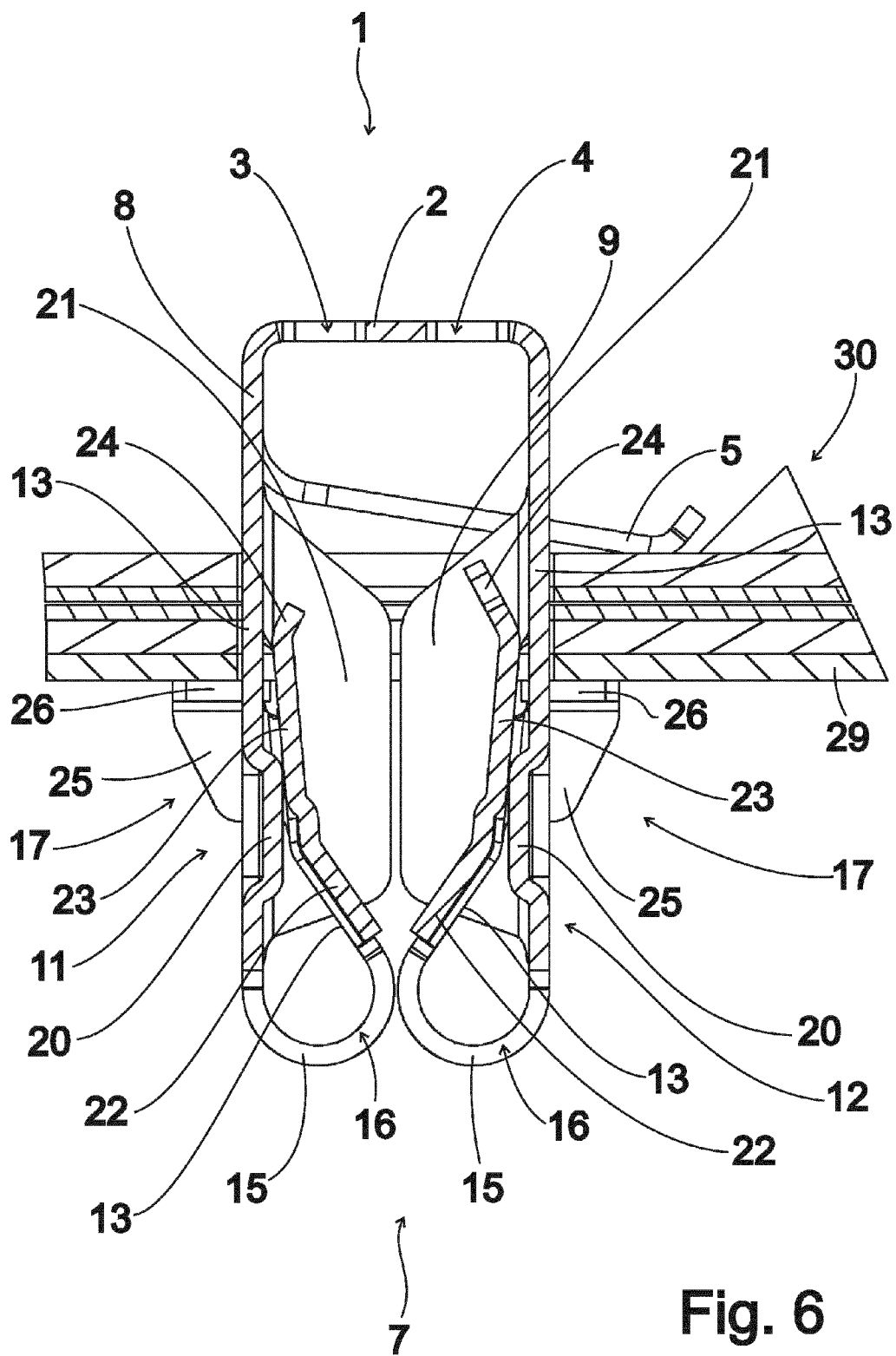
FIG. 6 is a sectional view of the exemplary embodiment according to FIG. 1 in the mounted situation of FIG. 5.

FIG. 6 is a longitudinal section of the exemplary embodiment of a fastening arrangement according to FIG. 1, in the mounted arrangement shown in FIG. 5. It is clearly apparent from FIG. 6 that the edge wings 21 disposed on the same respective sides of the outer wings 13 are disposed close together, with only a relatively narrow gap between them, so the outer wings 13 are blocked against giving way inwardly when high pull-out forces are exerted. Furthermore, on the exertion of high pull-out forces, the inner wings 14 are moved toward the outer wings 13 of their respective shaft arms 11, 12, thereby strengthening the rear engagement of the abutting portions 26 of the supporting cheeks 17. The bent-around portions 15 are also disposed close together in their end regions adjacent the inner wings 14, thus producing a stiffening effect in the foot region 7.

Figure 7:
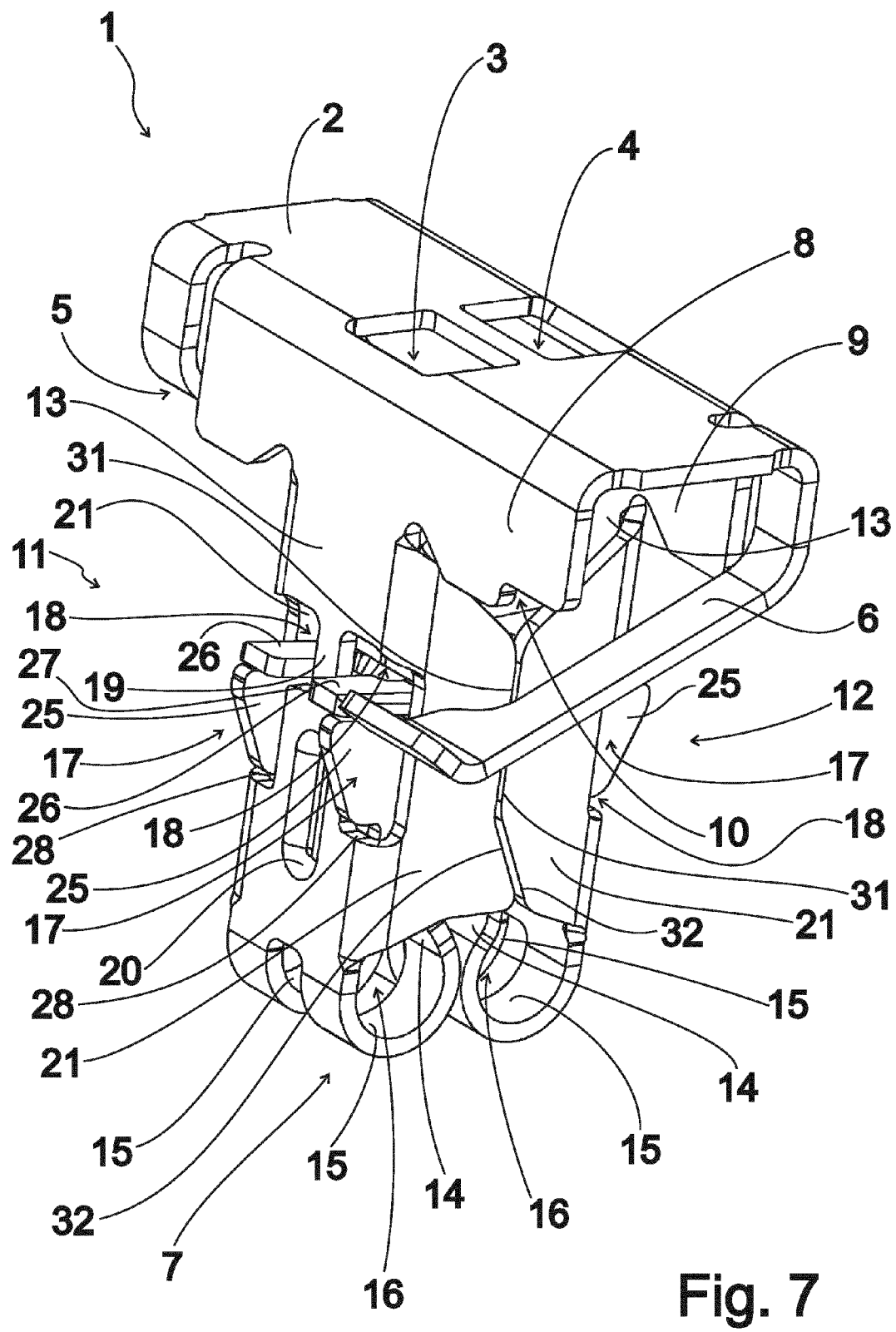
FIG. 7 is a perspective view of a further exemplary embodiment of a device according to the invention.

FIG. 7 is a perspective view of a further exemplary embodiment of a fastening device according to the invention, it being noted that mutually corresponding elements in the exemplary embodiment according to FIG. 1 and in the exemplary embodiment according to FIG. 7 are provided with the same reference numerals and, to avoid repetition, may not necessarily be described again in more detail below. In the further exemplary embodiment according to FIG. 7, the edge wings 21 are formed with mutually facing edges, each of which is configured with a straight, long, first subportion 31 and with a shorter, second subportion 32 that is angled with respect to the first subportion 31. The first subportions 31 extend in the longitudinal direction of the foot region 7, while the second subportions 32 are oriented at an oblique angle with respect to the longitudinal direction of the foot region 7. In this way, the two subportions 32 are pressed against each other under the effect of a force acting opposite to the insertion direction. As a result of the form lock of the second subportions 32 that is achieved in this way, the applied force is distributed evenly on the two supporting cheeks 17 and thus on the two shaft arms 11, 12, thus counteracting failure of one of the two shaft arms 11, 12 due to a force applied on only one side.

Figure 8:
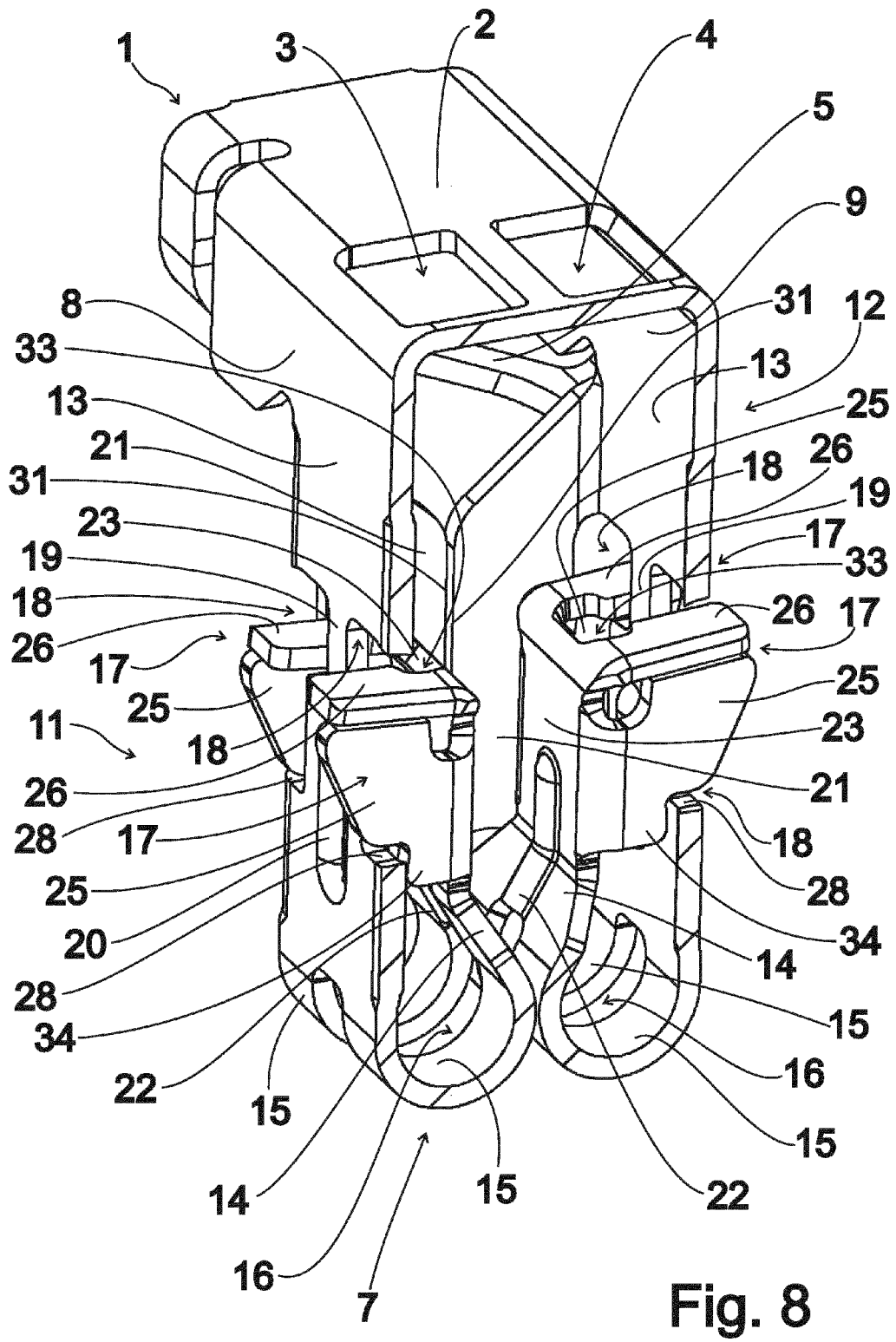
FIG. 8 is a perspective, partially cut-away view of the further exemplary embodiment according to FIG. 7.

FIG. 8 is a perspective, partially cut-away view of the further exemplary embodiment according to FIG. 7. It is apparent from FIG. 8 that in the further exemplary embodiment, the abutting portions 26 are formed by bending on the middle portion 23 of the particular inner wing 14 of the respective shaft arm 11, 12, and rest on the edges of the side portions 25 that face toward the cover plate 2. Each inner wing 14 has, in the region of the bend formed by the respective abutting portion 26 in the end region of the respective middle portion 23, an intervention opening 33, which is aligned, in the longitudinal direction of the foot region 7, with a respective access opening 3, 4. In addition, in the further exemplary embodiment, each side portion 25 is provided at its end remote from the cover plate 2 with a respective stop portion 34, which extends away from the cover plate 2 and out past the particular portion-cheek clearance 18, and which by its radially outward-facing edge is disposed opposite the respective outer wing 13. Movement toward each other by the inner wings 14 and the outer wings 13 is blocked in this way.

Figure 9:
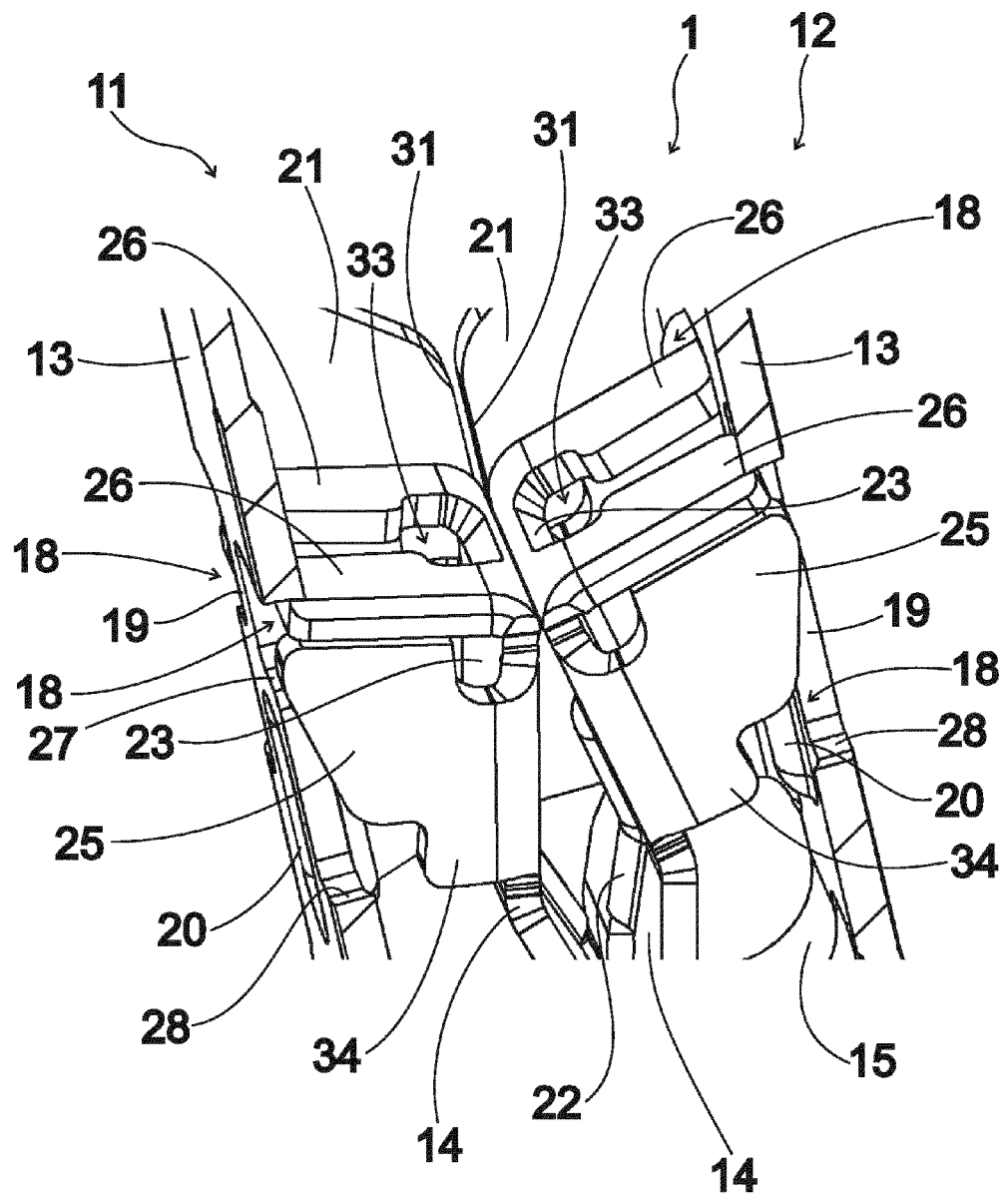
FIG. 9 is a perspective detail view of the further exemplary embodiment according to FIG. 7 with mutually abutting middle portions of inner wings of supporting cheeks.

FIG. 9 is a perspective detail view of the further exemplary embodiment according to FIG. 7 in the region of the middle portions 23 of the inner wings 14, in an end position of a bending movement that bends the inner wings 14 radially inward, of the kind caused, for example, by a disassembly tool (not shown in FIG. 9) guided in through the access openings 3, 4 and on into the intervention openings 33. In this end position, as already explained in connection with FIG. 4, the supporting cheeks 17 have fully entered the supporting-cheek clearances 18 and the inner space formed between the outer wings 13. In the further exemplary embodiment, the middle portions 23 abut each other in the region of the downward bends leading to the abutting portions 26 and block any further movement toward each other by the inner wings 14 themselves as a result of high forces applied by means of the mounting tool, the downward bends meanwhile having a stabilizing effect.

Figure 10:
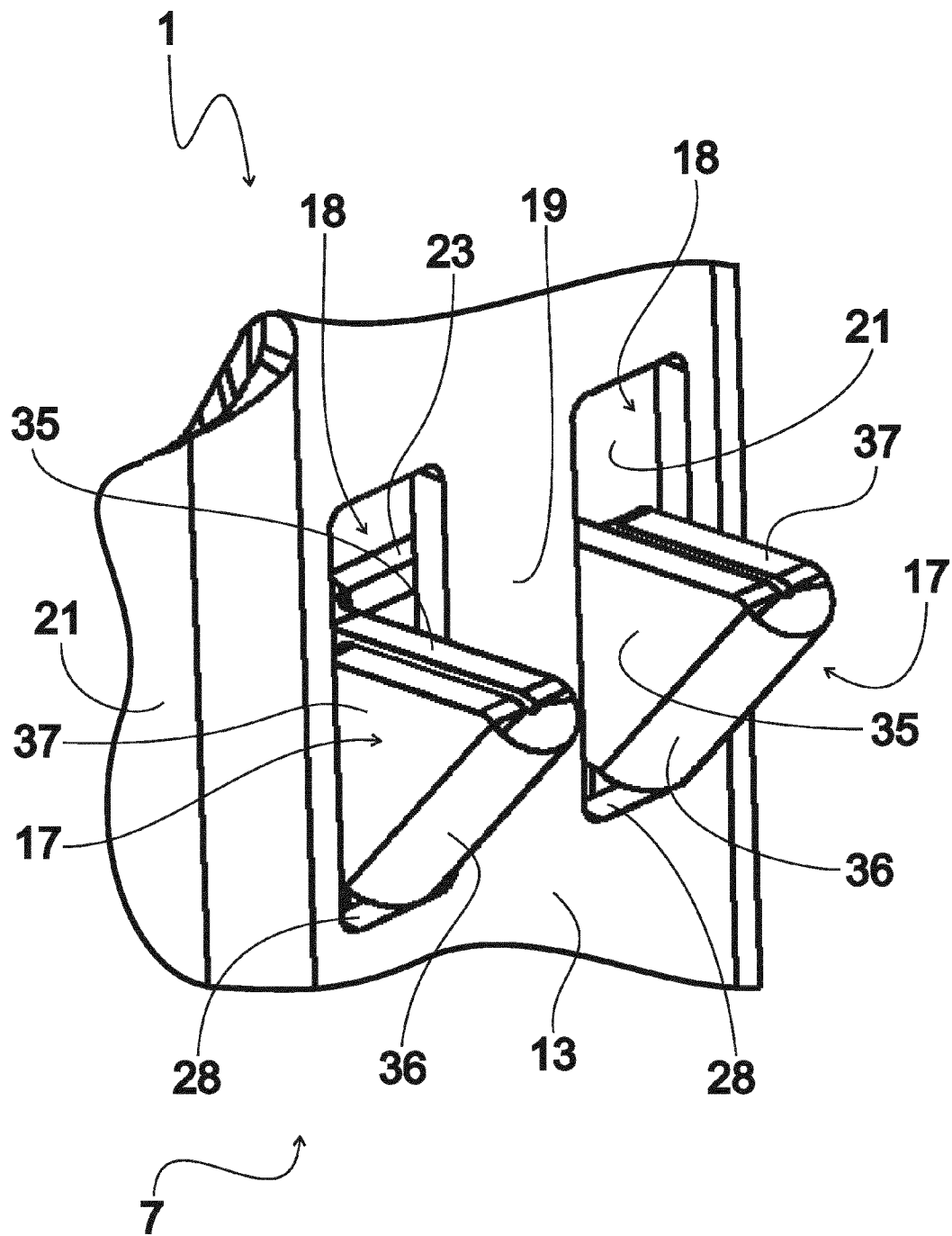
FIG. 10 is a perspective detail view corresponding to FIG. 3 of supporting cheeks of another exemplary embodiment.

FIG. 10 is a perspective detail view corresponding to FIG. 3 of supporting cheeks 17 of a further exemplary embodiment, it being noted that mutually corresponding elements in the exemplary embodiments according to FIG. 3 and FIG. 10 are provided with the same reference numerals and will not all be described again in more detail below. In the exemplary embodiment according to FIG. 10, each supporting cheek 17 comprises a respective tie wing 35 formed on the middle portion 23 and disposed inwardly adjacent the middle web 19, and an end wing 37 that stands connected to the tie wing 35 via a connecting portion 36. The connecting portion 36 protrudes outwardly beyond outer wing 13 and is beveled toward the foot region 7 to facilitate mounting. The end wings 37 are each disposed on the side of the respective tie wing 35 that faces away from the middle web 19 and are oriented parallel to the respective tie wing 35, each immersing in the respective supporting-cheek clearance 18 in order to abut the side-portion supporting edges 28.

Figure 11:
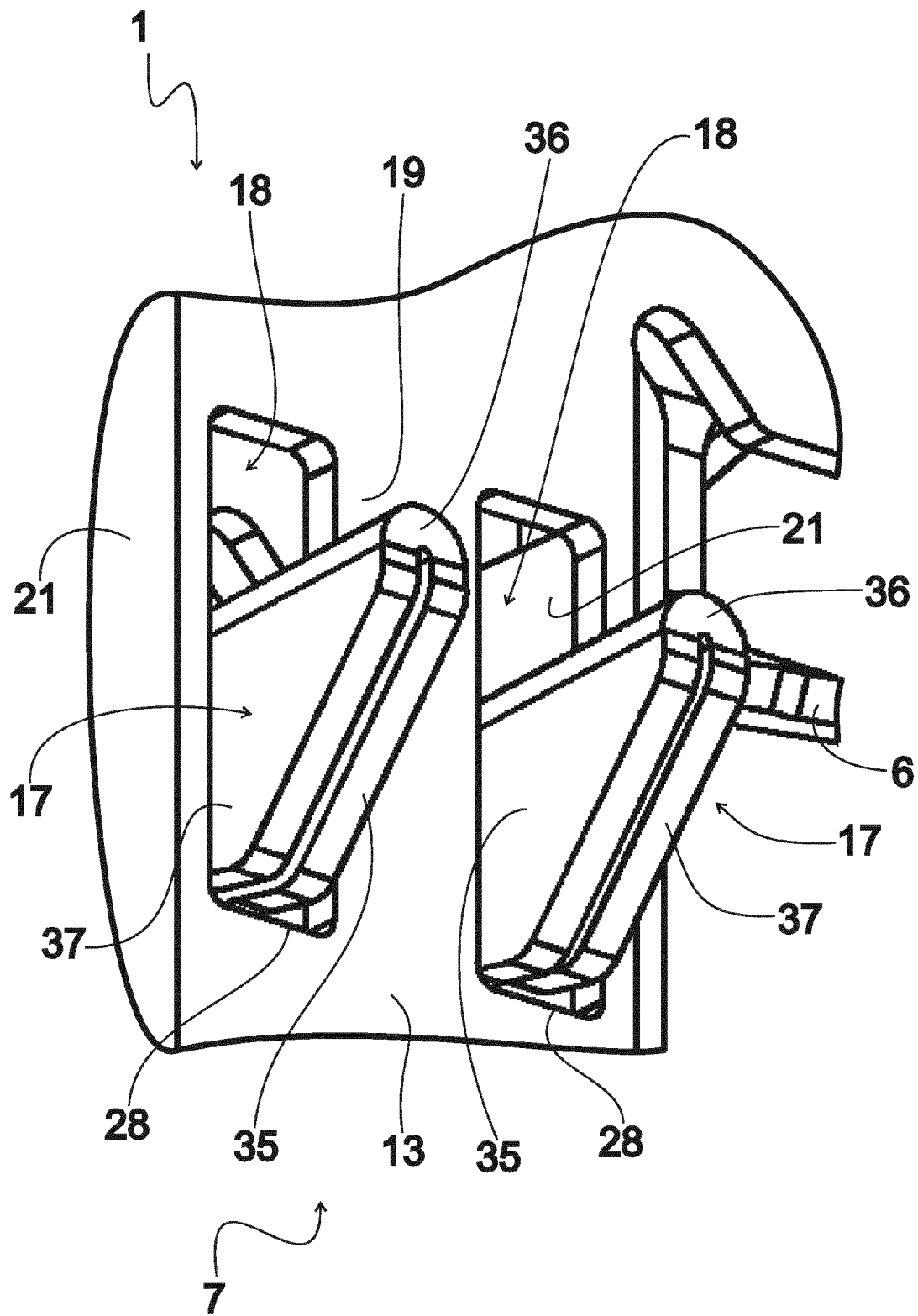
FIG. 11 is a perspective detail view corresponding to FIG. 3 of supporting cheeks of yet another exemplary embodiment.

FIG. 11 is a perspective detail view corresponding to FIG. 3 of supporting cheeks 17 of yet another exemplary embodiment, it being noted that mutually corresponding elements in the exemplary embodiments according to FIG. 3, FIG. 10 and FIG. 11 are provided with the same reference numerals and will not all be described again in more detail below. In the still further exemplary embodiment according to FIG. 11, as a modification with respect to the further exemplary embodiment according to FIG. 10, on each supporting cheek 17, the connecting portions 36 are disposed on the side of the tie wing 35 facing toward the head region 1 and are oriented at right angles to the outer wing 13, while the outward-facing sides of the tie wings 35 and end wings 37 are beveled toward the foot region 7 to facilitate mounting.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fastening device for fastening an attachment to a support part, comprising:
    a flat cover plate disposed in a head region of said fastening device;
    two shaft arms connected to said cover plate and extending away from said cover plate toward a foot region of said fastening device, each said shaft arm further comprising:
        an outer wing having a pair of edge wings extending along opposing longitudinal edges of the outer wings and extending toward respective edge wings of a respective other outer wing; and
        an inner wing having a supporting cheek that engages through supporting cheek clearances configured in a respective outer wing of each said shaft arm, each respective supporting cheek clearance being formed through and extending along one of said longitudinal edges of said outer wing;
    said cover plate further including side walls which, with said cover plate, form a U-shaped profile, each said outer wing formed on a respective side wall of said cover plate and said edge wings extending on respective opposite sides of said supporting cheek clearances wherein, along a direction of extent of said shaft arms, each said edge wing includes a first portion disposed on a first side of a respective supporting cheek clearance and a second portion disposed on a second, opposite side of said supporting cheek clearance, with respective edge wings on opposite outer wings abuttable with one another to resist pull-out forces.

2. The fastening device of claim 1, wherein said edge wings include respective mutually facing edge faces, and wherein said edge faces are straight and adjoin each other.

3. The fastening device of claim 1, wherein said edge wings include respective mutually facing edge faces, said wherein said edge faces each have two straight subportions oriented angularly to each other and adjoining each other.

4. The fastening device of claim 1, wherein each said supporting cheek has an L-shaped configuration, each further comprising an abutting portion oriented parallel to said cover plate and a side portion oriented at a right angle to said abutting portion.

5. The fastening device of claim 4, wherein each said abutting portion is formed on a respective said side portion by bending.

6. The fastening device of claim 4, wherein each said abutting portion is formed on a respective middle portion of an inner wing by bending.

7. The fastening device of claim 4, wherein each said side portion comprises, on an opposite side from said abutting portion, a stop portion disposed opposite said outer wing.

8. The fastening device of claim 4, wherein each said outer wing includes supporting edges disposed opposite said abutting portions and side portions on respective sides of said outer wing facing away from said cover plate.

9. The fastening device of claim 1, wherein said cover plate includes spring arms extending obliquely away from said cover plate toward the foot region.

10. The fastening device of claim 1, wherein each said inner wing comprises at an end thereof facing said cover plate, an end portion disposed opposite an access opening formed in said cover plate.

11. The fastening device of claim 10, wherein, in an end position, said end portions of said inner wings abut each other and block movement of said inner wings toward each other.

12. The fastening device of claim 1, wherein each inner wing includes at least one entrance opening disposed opposite a respective access opening formed in said cover plate.

13. The fastening device of claim 1, wherein at least one of said outer wings and said inner wings include stiffening ribs.

14. The fastening device of claim 1, wherein each said shaft arm includes two bent-around portions formed between said outer wing and said inner wing thereof, and a bend clearance disposed between said bend-around portions.

15. The fastening device of claim 1, wherein said edge wings are each disposed immediately adjacent a respective edge wing of a respective other outer wing.

16. The fastening device of claim 1, wherein said edge wings each extend on respective opposite sides of said supporting cheek clearances substantially over the entire length of said outer wings of said shaft arms.

17. The fastening device of claim 1, wherein each said shaft arm is formed in a middle region of a respective side wall, each said side wall including end edge regions on respective opposite sides of each said shaft arm, said end edge regions disposed perpendicular to said flat cover plate and abuttable with a support part.

18. A fastening device for fastening an attachment to a support part, comprising:
   a flat cover plate disposed in a head region of said fastening device;
   two shaft arms connected to said cover plate and extending away from said cover plate toward a foot region of said fastening device, each said shaft arm further comprising:
      an outer wing having a pair of edge wings extending along opposing longitudinal edges of the outer wings and extending toward respective edge wings of a respective other outer wing; and
      an inner wing having a supporting cheek that engages through supporting-cheek clearances configured in a respective outer wing of each said shaft arm, each respective supporting cheek clearance being formed through and extending along one of said longitudinal edges of said outer wing;
   said cover plate further including side walls which, with said cover plate, form a U-shaped profile, each said outer wing formed on a respective side wall of said cover plate and said edge wings extending on respective opposite side of said supporting-cheek clearances; and
   wherein each said supporting cheek comprises a tie wing formed on a middle portion thereof and an end wing connected to said tie wing via a connecting portion, wherein said tie wing and said end wing of each said supporting cheek are oriented parallel to each other.

19. The fastening device of claim 18, wherein said connecting portion is oriented along a direction outwardly away from a respective outer wing and obliquely toward said foot region.

20. The fastening device of claim 18, wherein said connecting portion is oriented along a direction toward said head region and at a right angle to said outer wings.

* * * * *